United States Patent
Huang

(10) Patent No.: US 9,963,193 B2
(45) Date of Patent: May 8, 2018

(54) CABLE POSITIONING STRUCTURE FOR HYDRAULIC BRAKE OF BICYCLE

(71) Applicant: Yu-Ming Huang, Changhua (TW)

(72) Inventor: Yu-Ming Huang, Changhua (TW)

(73) Assignee: TEKTRO TECHNOLOGY CORP, Changhua (TW)

( * ) Notice: Subject to any disclaimer, the term of this patent is extended or adjusted under 35 U.S.C. 154(b) by 30 days.

(21) Appl. No.: 15/194,421

(22) Filed: Jun. 27, 2016

(65) Prior Publication Data

US 2017/0369120 A1   Dec. 28, 2017

(51) Int. Cl.
*B62L 3/02*   (2006.01)

(52) U.S. Cl.
CPC .................... *B62L 3/023* (2013.01)

(58) Field of Classification Search
CPC .... B62L 3/023; B62L 3/02; B62L 5/06; F16D 2125/60; F16D 2125/62; B60T 11/046
See application file for complete search history.

(56) References Cited

U.S. PATENT DOCUMENTS

2012/0241261 A1* 9/2012 Tsai ...................... F16D 55/225
                                                                  188/24.21
2015/0291251 A1   10/2015 Lin

FOREIGN PATENT DOCUMENTS

WO   WO-2014157038 A1 * 10/2014   ............. B60T 7/102
WO   WO-2015030027 A1 *  3/2015   ............... B62L 3/08

* cited by examiner

*Primary Examiner* — Melanie Torres Williams

(57) ABSTRACT

A cable positioning structure for hydraulic brake of a bicycle is disclosed. The cable positioning structure comprises the caliper and the transmission member connected with each other, and is capable of connecting with original braking cable. It is not necessary to arrange an oil pipe to connect the handlebar and to drive the piston, and easy to be assembled or de-assembled and cost down.

4 Claims, 7 Drawing Sheets

CABLE POSITIONING STRUCTURE FOR HYDRAULIC BRAKE OF BICYCLE

FIELD OF THE INVENTION

The present invention relates to a bicycle, and more particularly to a cable positioning structure for hydraulic brake of a bicycle.

BACKGROUND OF THE INVENTION

Generally speaking, a structure that is adopted in a bicycle to achieve an effect of braking by hydraulic transmission can be classified as a control-by-wire hydraulic brake, where a brake grip is provided with a brake wire that is connected to a transmission component, and a fully hydraulic brake structure, where a transmission components are directly installed in the brake grip and the transmission components comprise at least a fluid reservoir, a piston, and connection rod (or a transmission arm), in which the transmission components are operatively coupled to the brake unit and the brake unit comprises at least one caliper (or clamping arm) and two brake shoes.

The present invention is made to provide a control-by-wire hydraulic bicycle brake structure that comprises a brake wire provided at a brake grip for connecting a transmission component to actuate a brake unit. A known prior art related to such a structure will be discussed in the following.

Taiwan Utility Model Publication No. 476324 discloses a master cylinder structure for bicycle disc brake, which features easy installation and excellent resistance against penetration and leakage. Internal threading is formed on an external circumference of a front section of a mounting seat and internal threading is formed inside a corresponding tubular section. The mounting seat forms a space for receiving a spring. A guide slot is formed in the space at a location close to a front end to receive an O-ring to fill therein. A brake wire coupler has a front section from which an elongate bar section extends into the tubular section to abut a hydraulic cylinder body and has an end forming a head. The head forms a fixing hole longitudinally extending therethrough to receive a fixing bolt to engage therein to fix a brake wire. The head forms a recess inside the fixing hole to receive an opening rim of a dust cap to fit therein.

However, the brake wire is directly coupled to a piston. When a user wishes to make an adjustment of the brake wire, such as stretching the brake wire, the piston is also caused to move, making hydraulic fluid access hole blocked thereby converting the interior of the hydraulic cylinder into a closed system, thereby leading to abnormality of gas lock.

Please also refer to U.S. Patent Publication no. 2015/0291251 ('251 hereafter), it disclosed that "When in use, the handle of the break is pressed so the break line 13 drives the arm 12 to move toward the oil chamber 102 (see FIG. 4), namely driving the piston 20 to move horizontally through the arm 12, so the hydraulic oil stored in the oil chamber 102 can be squeezed out by the piston 20 to drive the break pad 11 in the receiving space 101. When the handle of the break is released, the resilient unit 30 can push the piston 20 back to its original position. Furthermore, the knob 40 is used to drive the piston 20 to axially move on the positioning portion 121 to conduct fine-tuning of the break." Please note that the knob of '251 is rotated to move axially to drive the rod of '251 and the piston of '251. It should be known that the moving directions of the knob and the rod are the same and in parallel. That is, the moving directions of the knob and the rod are in the axial direction of the rod. It may make the torque be zero sometimes.

In view of this problem, the present invention aims to provide a solution to overcome such a drawback.

SUMMARY OF THE INVENTION

Therefore, a cable positioning structure for hydraulic brake of a bicycle is provided. It is easy to be assembled or de-assembled and cost down.

A cable positioning structure for a hydraulic brake of a bicycle, comprising a caliper; a transmission member, connected with the caliper and controlling the movement of the caliper with one end thereof, the transmission member includes a reservoir, a piston, a transmission arm, and a push rod; the piston is movably arranged inside the reservoir, the transmission arm is arranged at an outer side of the caliper, one end of the transmission arm is pivotably connected to an outside end of the reservoir and disposed distant from the caliper, one end of the piston is connected to an adaptive position of the transmission arm between two ends thereof via the push rod, the end of the transmission arm distant from the reservoir is connected with a braking cable and moved together; and an adjusting button, arranged outside the reservoir, the braking cable is connected from the end of the transmission arm distant from the reservoir to a handlebar of the bicycle through the adjusting button, characterized as: a fixing screw is connected between the transmission arm and the push rod to control the transmission arm to be released or fastened, and the adjusting button is used for adjusting the length and tension of the braking cable, and the fixing screw, the transmission arm, and the push rod are orthogonal to one another.

In some embodiments, the caliper and the transmission member are integrated.

In some embodiments, the caliper connects with two brake shoes spaced from each other, and one end of the transmission arm is connected with the caliper for a pivot and the other end thereof is connected with the braking cable freely and then the transmission arm is controlled by the braking cable to push the push rod which is connected between two ends of the transmission arm to drive the push rod and the piston of the caliper to hydraulically activate the caliper to control the two brake shoes to move relatively.

In some embodiments, the transmission arm further comprises a bolt and a pressing plate, and the bolt and the pressing plate are arranged at two ends of the transmission arm respectively.

BRIEF DESCRIPTION OF THE DRAWINGS

FIGS. 5, 6, and 7 are cross-sectional views of the cable positioning structure for hydraulic brake of a bicycle while moving according to present invention, wherein FIG. 5 is a cross-sectional view of FIG. 3 along line A-A, FIG. 6 is a cross-sectional view of FIG. 4 along line B-B while a fixing screw is fastened, and FIG. 7 is a cross-sectional view of FIG. 4 along line B-B while the fixing screw is released.

DESCRIPTION OF THE PREFERRED EMBODIMENT

Figure 1:
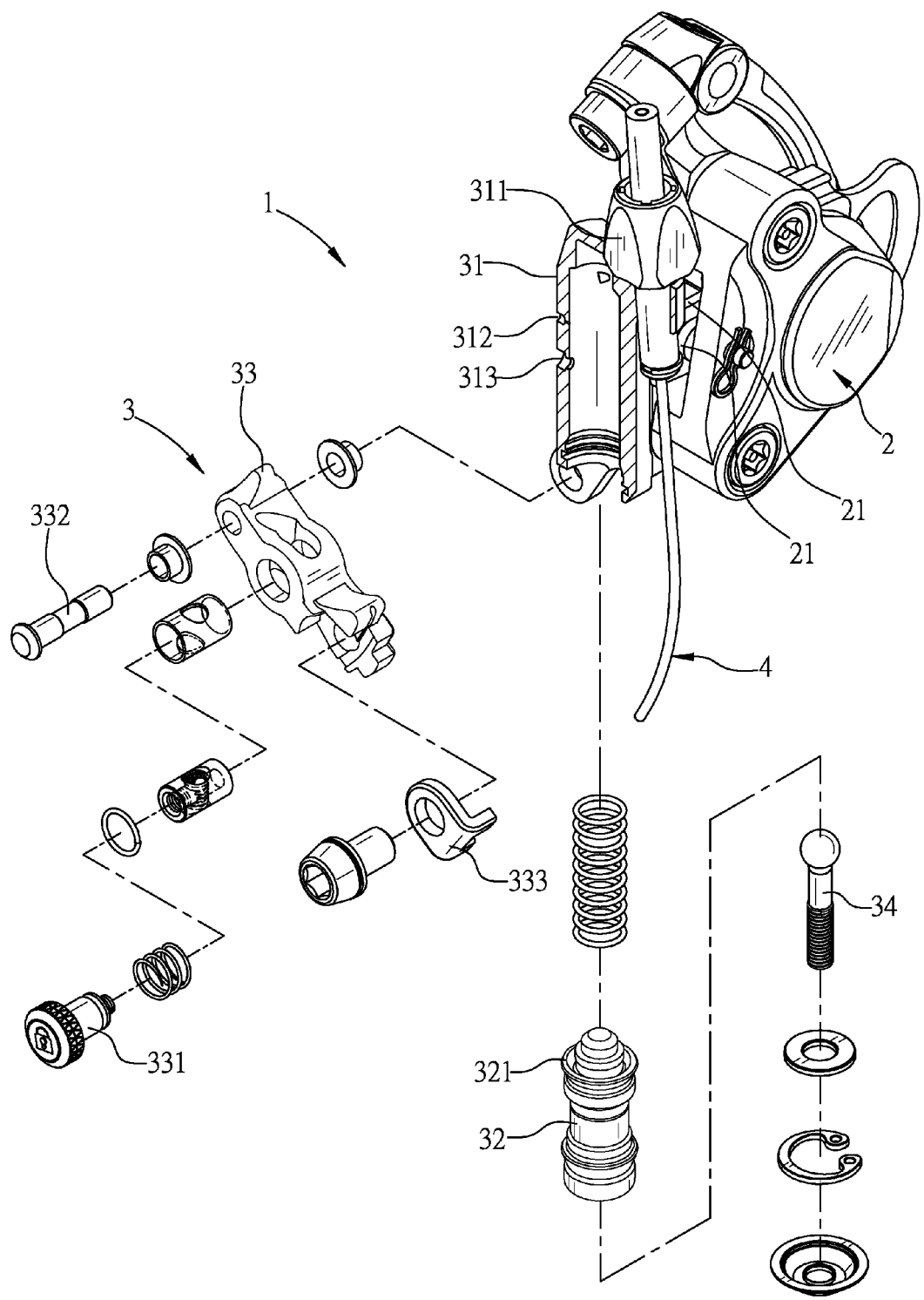
FIG. 1 is a partial exploded view of a cable positioning structure for hydraulic brake of a bicycle according to present invention.
Figure 2:
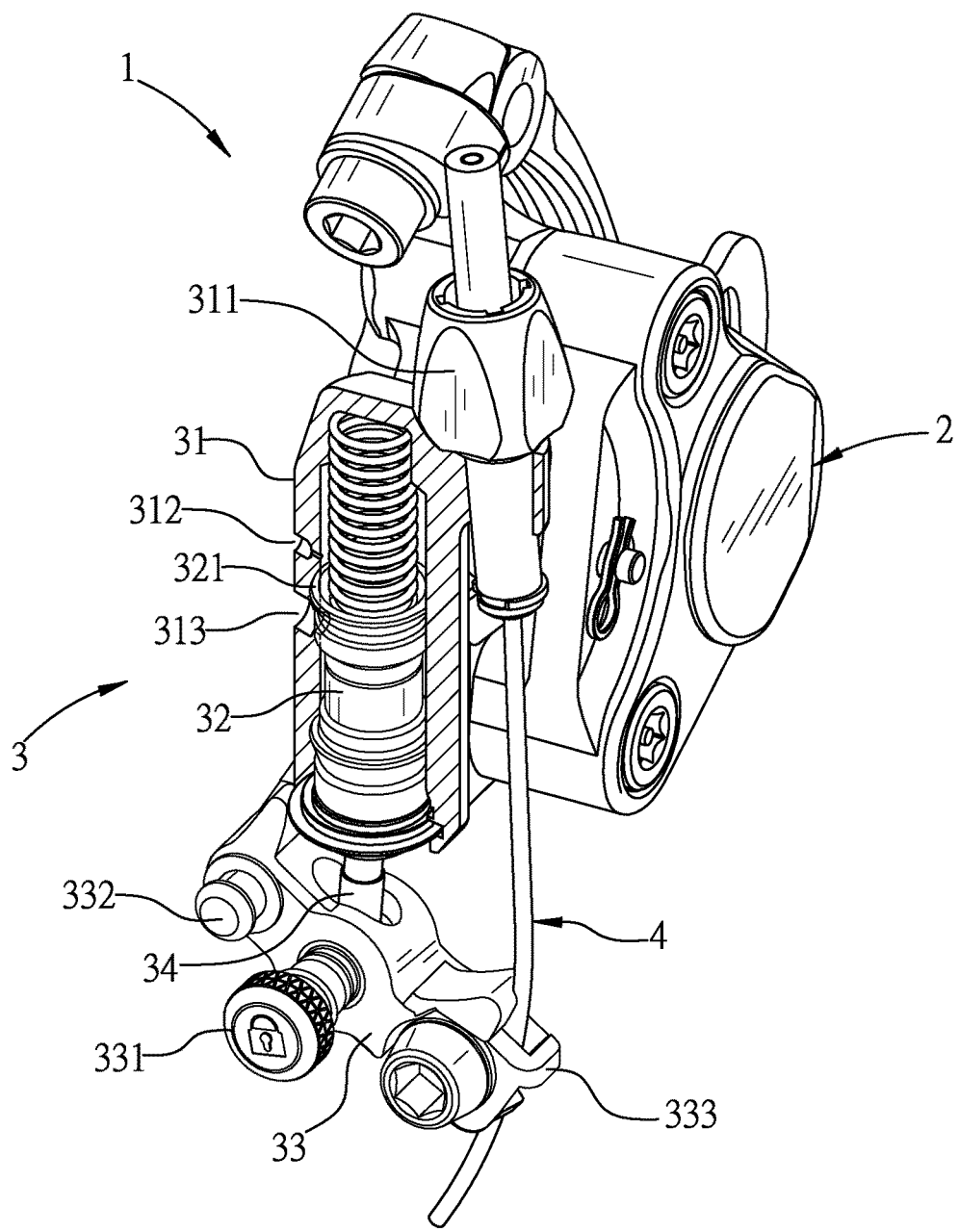
FIG. 2 is a cross section view of the cable positioning structure for hydraulic brake of a bicycle according to present invention.
Figure 3:
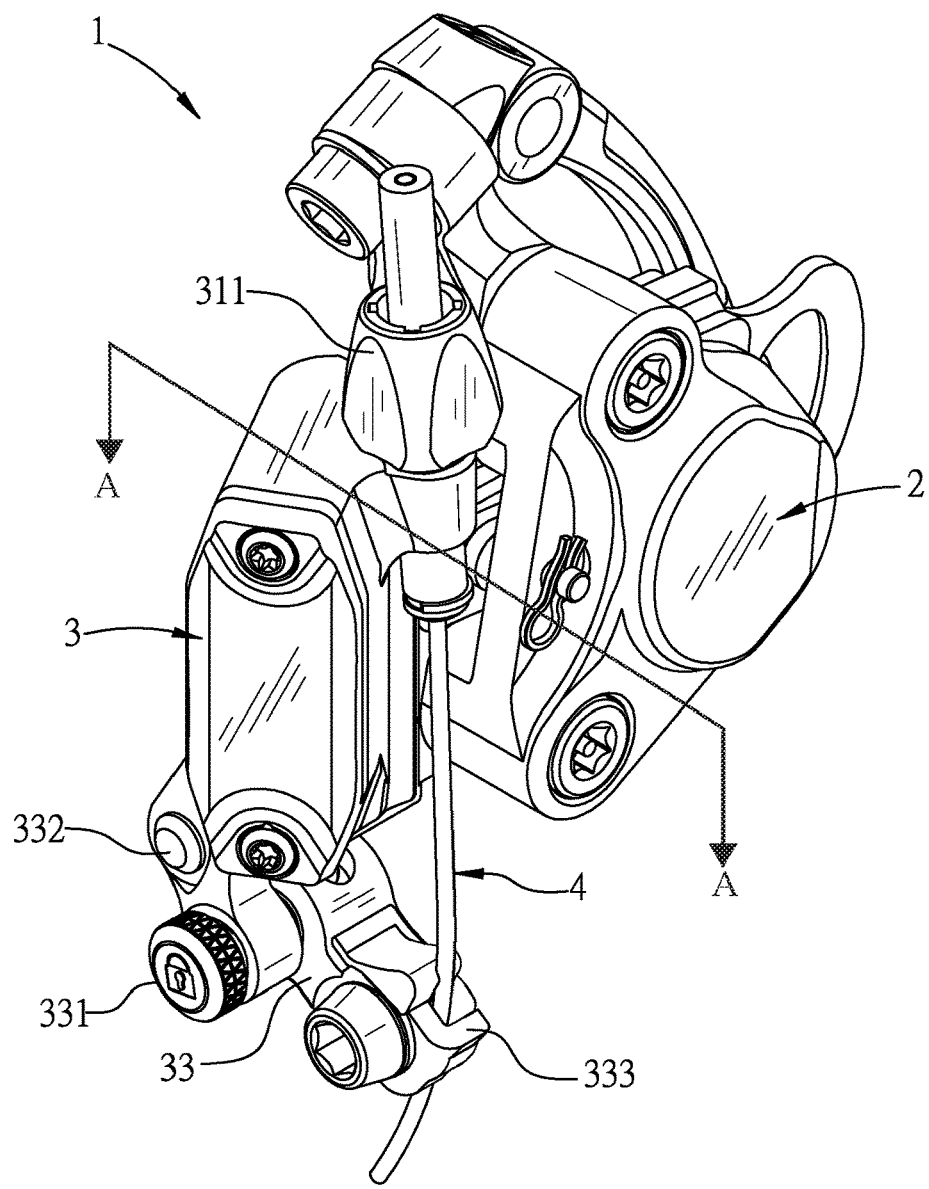
FIG. 3 is a perspective view of the cable positioning structure for hydraulic brake of a bicycle according to present invention.
Figure 4:
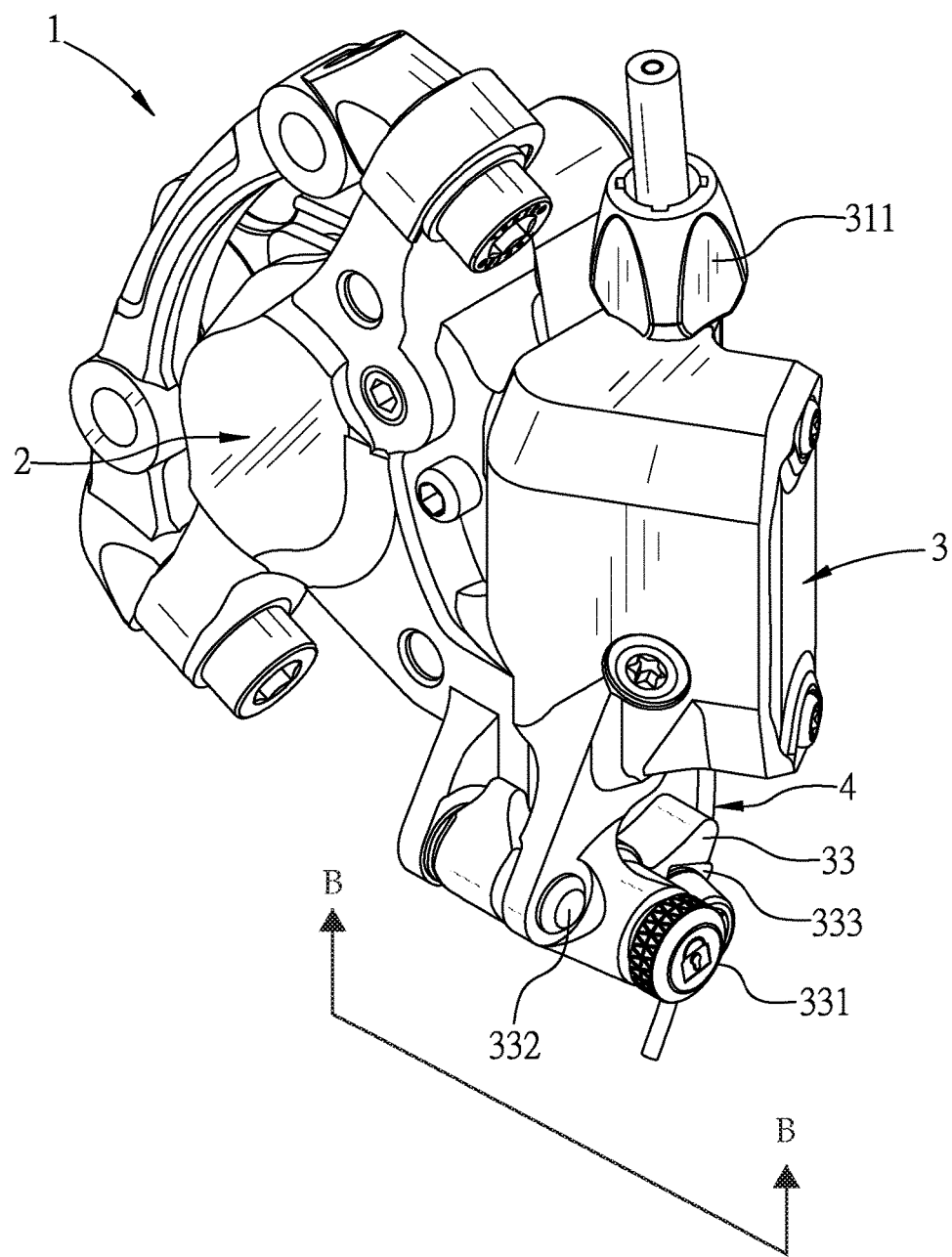
FIG. 4 is another view of the cable positioning structure for hydraulic brake of a bicycle according to present invention.
Figure 5:
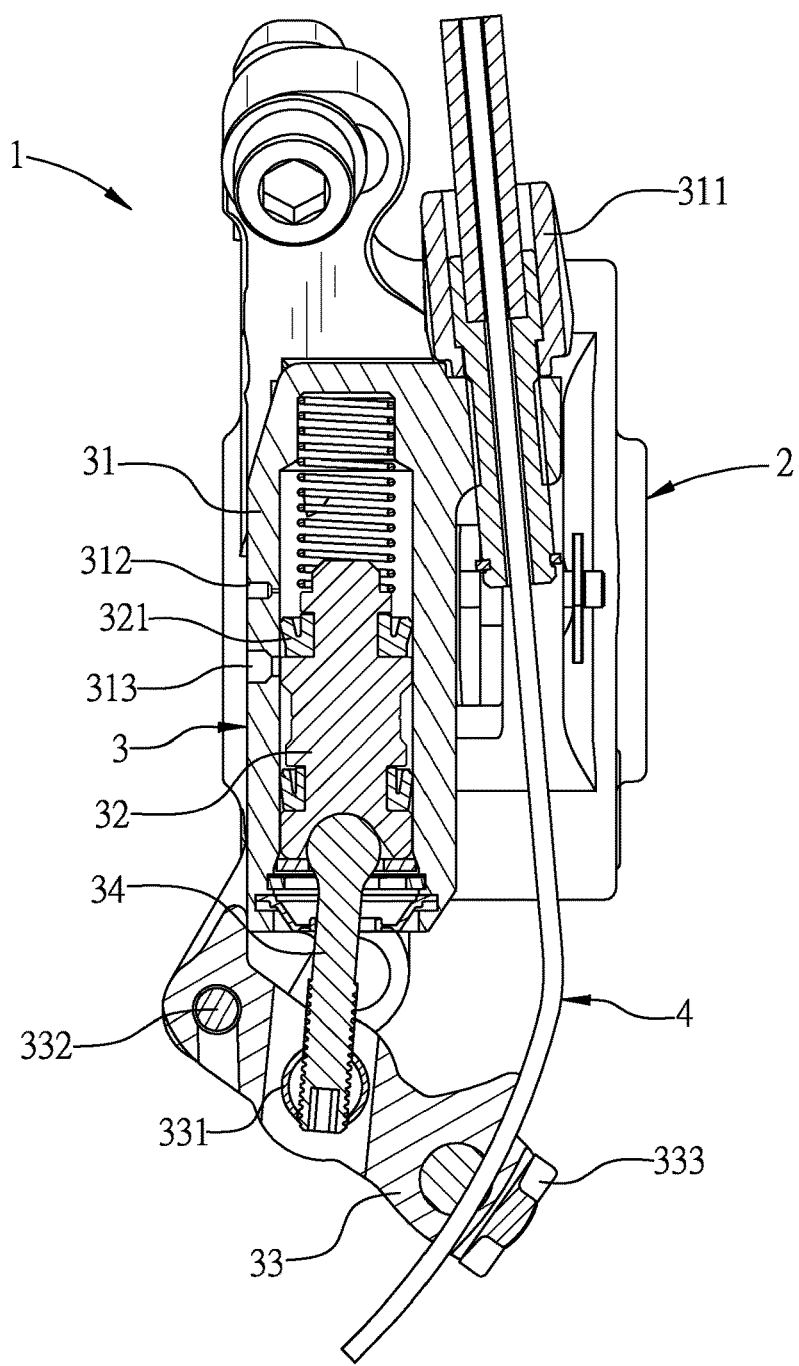
Figure 6:
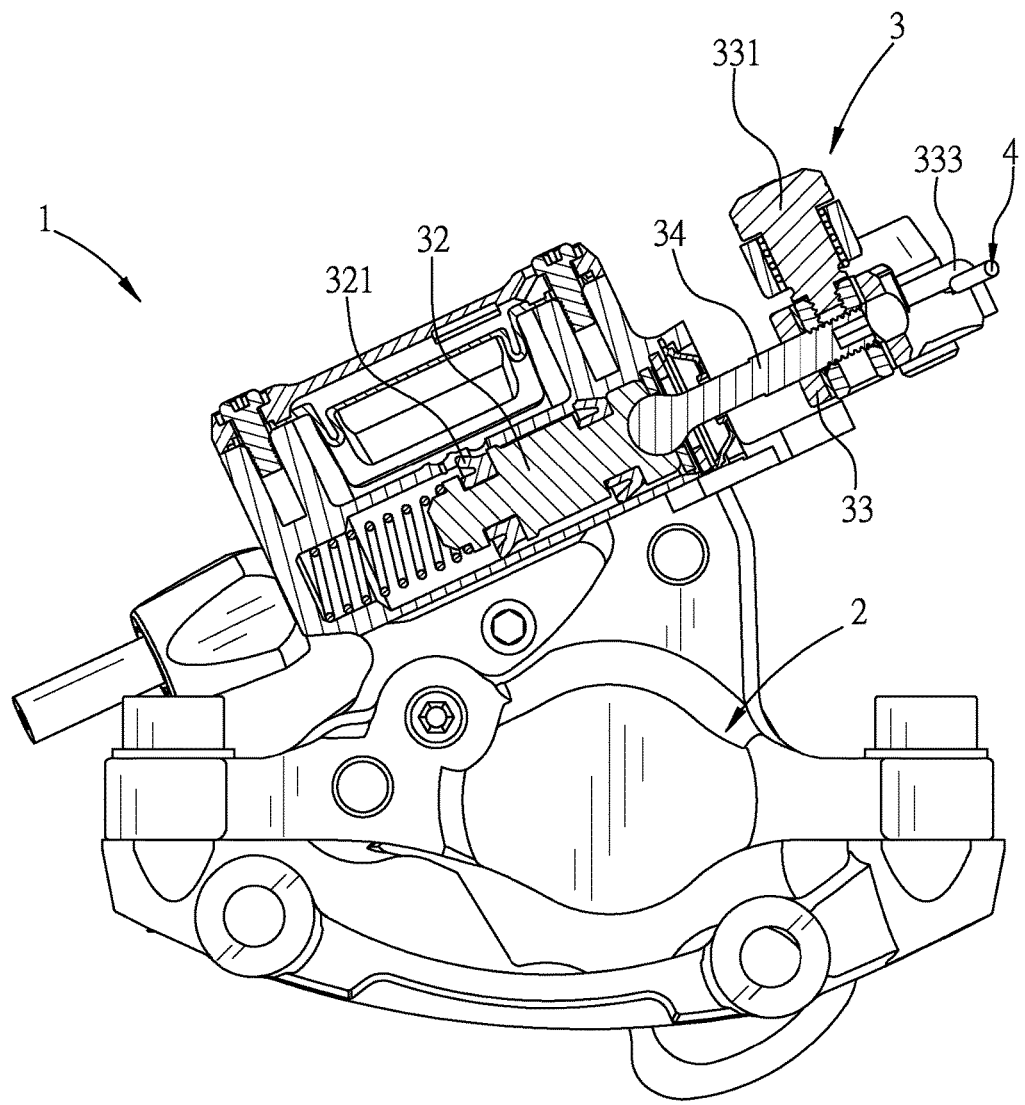
Figure 7:
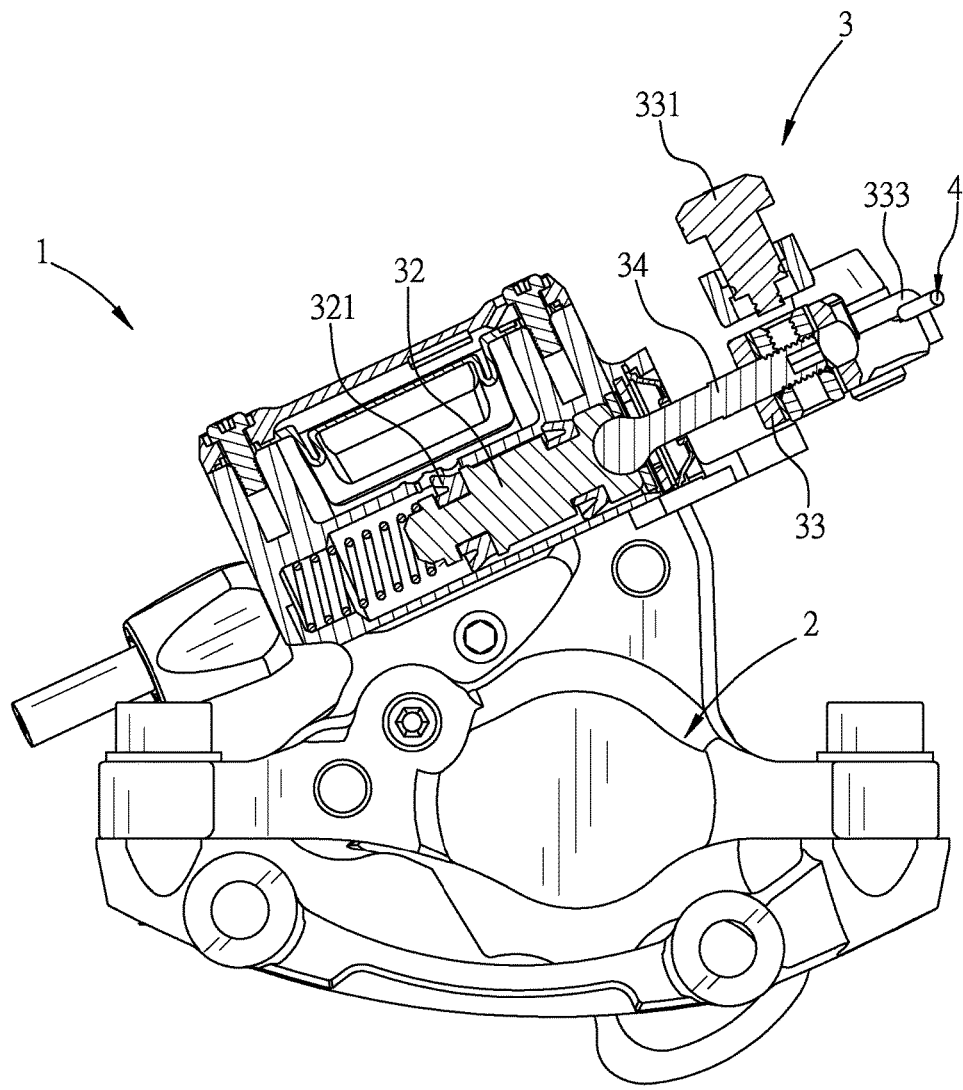

FIG. 1 is a partial exploded view of a cable positioning structure for hydraulic brake of a bicycle according to present invention. FIG. 2 is a cross section view of the cable positioning structure for hydraulic brake of a bicycle according to present invention. FIG. 3 is a perspective view of the cable positioning structure for hydraulic brake of a bicycle according to present invention. FIG. 4 is another view of the cable positioning structure for hydraulic brake of a bicycle according to present invention. FIGS. 5, 6, and 7 are cross-sectional views of the cable positioning structure for hydraulic brake of a bicycle while moving according to present invention, wherein FIG. 5 is a cross-sectional view of FIG. 3 along line A-A, FIG. 6 is a cross-sectional view of FIG. 4 along line B-B while a fixing screw is fastened, and FIG. 7 is a cross-sectional view of FIG. 4 along line B-B while the fixing screw is released.

Please refer to FIG. 1 to FIG. 6, the cable positioning structure 1 for hydraulic brake of a bicycle may comprise a caliper 2, a transmission member 3, and an adjusting button 311. The caliper 2 and the transmission member 3 may be integrated, but not limited thereto.

The caliper 2 may connect with two brake shoes 21 spaced from each other.

The transmission member 3 may be connected with the caliper 2 and controlling the movement of the caliper 2 with one end thereof.

In addition, the transmission member 3 may include a reservoir 31, a piston 32, a transmission arm 33, and a push rod 34. The reservoir 31 may be filled oil. The piston 32 may be movably arranged inside the reservoir 31. The transmission arm 33 may be arranged at an outer side of the caliper 2 and one end of the transmission arm 33 may be pivotably connected to an outside end of the reservoir 31 and disposed distant from the caliper 2. One end of the piston 32 may be connected to an adaptive position of the transmission arm 33 between two ends thereof via the push rod 34. The adaptive position may be close to the end of the transmission arm 33 adjacent to the reservoir 31, but not limited thereof. The end of the transmission arm 33 distant from the reservoir 31 may be connected with a braking cable 4 and moved together.

The adjusting button 311 may be arranged outside the reservoir 31. The braking cable 4 may be connected from the end of the transmission arm 33 distant from the reservoir 31 to a handlebar (not shown) of a bicycle (not shown) through the adjusting button 311. A fixing screw 331 may be connected between the transmission arm 33 and the push rod 34 to control the transmission arm 34 to be released (shown as in FIG. 7) or fastened (shown as in FIG. 6), and the adjusting button 311 is used for adjusting the length and tension of the braking cable 4. And the fixing screw 331, the transmission arm 33, and the push rod 34 are orthogonal to one another. Therefore, the torque is not zero to make the operation smoothly.

That is, a small hole 312 may be formed at the reservoir 31 adjacent to the adjusting button 311 and a big hole 313 may be formed at the reservoir 31 distant from the adjusting button 311. Ordinarily, the fixing screw 331 is released to a release status so that the transmission arm 33 and the braking cable 4 may move together and further to drive the piston 32 to move. The fixing screw 331 may be turned to a fix status while adjusting the braking cable 4, the fixing screw 331 may fasten the transmission arm 33 and then the length and tension of the braking cable 4 may be adjusted with the adjusting button 311. It has simplified structure and is easy to operate. Furthermore, it would not cause a sealant 321 arranged at the end of the piston 32 adjacent to the adjusting button 311 to seal the small hole 312 and make inside of the reservoir 31 to be formed a close system to result in gas locking.

Additionally, the transmission arm 33 may further comprise a bolt 332 and a pressing plate 333. The bolt 332 and the pressing plate 333 may be arranged at two ends of the transmission arm 33 respectively.

After the user assembles the piston 32 and the push rod 34 into the reservoir 32, the fixing screw 331 may be loosed from the small hole 312 to make the oil inside the reservoir 31 flow free.

Therefore, when the rider presses the handlebar (not show) to tension the braking cable 4 (mechanical operation), the transmission arm 33 is driven to pivot toward the reservoir 31 and further the push rod 34 is driven to push the piston 32 toward the caliper 2. Finally, those two brake shoes 21 of the caliper 2 may be controller by hydraulic means to move closer relatively (hydraulic operation). It may achieve the efficient of braking. That is, please refer to FIGS. 2, 3, 5, and 6, one end of the transmission arm 33 is connected with the caliper 2 for a pivot and the other end thereof is connected with the braking cable 4 freely and then the transmission arm 33 is controlled by the braking cable 4 to push the push rod 34 which is connected between two ends of the transmission arm 33 to drive the push rod 34 and the piston 32 of the caliper 2 in series to hydraulically activate the caliper 4, and further to control the two brake shoes 21 to move relatively.

The above-mentioned cable positioning structure 1 comprises the caliper 2 and the transmission member 3 connected with each other, and is capable of connecting with original braking cable 4. It is not necessary to arrange an oil pipe to connect the handlebar and to drive the piston (shown as in prior art), and easy to be assembled or de-assembled and cost down.

What is claimed is:

1. A cable positioning structure for a hydraulic brake of a bicycle, comprising a caliper; a transmission member, integrated with the caliper and controlling the movement of the caliper with one end thereof, the transmission member includes a reservoir, a piston, a transmission arm, and a push rod; the piston is movably arranged inside the reservoir, the transmission arm is arranged at an outer side of the caliper, one end of the transmission arm is pivotably connected to an outside end of the reservoir and disposed distant from the caliper, one end of the piston is connected to an adaptive position of the transmission arm between two ends thereof via the push rod, the end of the transmission arm distant from the reservoir is connected with a braking cable and moved together; and an adjusting button, arranged outside the reservoir, the braking cable is connected from the end of the transmission arm distant from the reservoir to a handlebar of the bicycle through the adjusting button, characterized as:

a fixing screw is connected between the transmission arm and the push rod to control the transmission arm to be released or fastened, and the adjusting button is used for adjusting the length and tension of the braking cable, and the fixing screw, the transmission arm, and;

a fixing screw is connected between the transmission arm and the push rod to control the transmission arm to be released or fastened, and the adjusting button is used for adjusting the length and tension of the braking cable, and the fixing screw, the transmission arm, and the push rod are orthogonal to one another.

2. The cable positioning structure as claimed in claim 1, wherein the caliper and the transmission member are integrated.

3. The cable positioning structure as claimed in claim 1, wherein the caliper connects with two brake shoes spaced from each other, and one end of the transmission arm is connected with the caliper for a pivot and the other end thereof is connected with the braking cable freely and then the transmission arm is controlled by the braking cable to push the push rod which is connected between two ends of the transmission arm to drive the push rod and the piston of the caliper to hydraulically activate the caliper to control the two brake shoes to move relatively.

4. The cable positioning structure as claimed in claim 1, wherein the transmission arm further comprises a bolt and a pressing plate, and the bolt and the pressing plate are arranged at two ends of the transmission arm respectively.

\* \* \* \* \*